United States Patent
Gao et al.

(10) Patent No.: US 12,393,252 B2
(45) Date of Patent: Aug. 19, 2025

(54) DETERMINING A COMMON TRANSFER CONFIGURATION FOR A PLURALITY OF STORAGE DEVICES IN AN EMBEDDED STORAGE BASED ON FIREWARE VERSION OF EACH STORAGE DEVICE

(71) Applicant: RayMX Microelectronics, Corp., Hefei (CN)

(72) Inventors: Peng Gao, Hefei (CN); Zhifan Liang, Hefei (CN)

(73) Assignee: RAYMX MICROELECTRONICS, CORP., Hefei (CN)

( * ) Notice: Subject to any disclaimer, the term of this patent is extended or adjusted under 35 U.S.C. 154(b) by 173 days.

(21) Appl. No.: 18/356,311

(22) Filed: Jul. 21, 2023

(65) Prior Publication Data

US 2024/0201772 A1     Jun. 20, 2024

(30) Foreign Application Priority Data

Dec. 16, 2022   (CN) .......................... 202211622219.6

(51) Int. Cl.
  *G06F 1/32*     (2019.01)
  *G06F 1/08*     (2006.01)
  *G06F 1/324*    (2019.01)
  *G06F 8/71*     (2018.01)

(52) U.S. Cl.
  CPC ................ *G06F 1/324* (2013.01); *G06F 1/08* (2013.01); *G06F 8/71* (2013.01)

(58) Field of Classification Search
  None
  See application file for complete search history.

(56) References Cited

U.S. PATENT DOCUMENTS

| | | | | |
|---|---|---|---|---|
| 8,918,663 | B2* | 12/2014 | Russo | G06F 13/42 713/320 |
| 9,092,160 | B2 | 7/2015 | Tomlin | |
| 2013/0332918 | A1* | 12/2013 | Aoyagi | G06F 8/65 717/172 |
| 2014/0082402 | A1 | 3/2014 | Lee et al. | |
| 2018/0103023 | A1* | 4/2018 | Linton | G06F 21/44 |
| 2018/0314511 | A1* | 11/2018 | Butcher | G06F 8/654 |

FOREIGN PATENT DOCUMENTS

| | | |
|---|---|---|
| CN | 109801671 A | 5/2019 |
| TW | 201243605 A | 11/2012 |

\* cited by examiner

*Primary Examiner* — Danny Chan
(74) *Attorney, Agent, or Firm* — McClure, Qualey & Rodack, LLP (57) ABSTRACT

An embedded storage device with a plurality of storage devices is used to obtain the firmware version of the plurality of storage devices, align a transmission configuration of at least one of the plurality of storage devices downward according to the firmware version of each of the plurality of storage devices for determining a final transmission configuration, and enable the plurality of storage devices to read and write with the same final transmission configuration.

16 Claims, 5 Drawing Sheets

DETERMINING A COMMON TRANSFER CONFIGURATION FOR A PLURALITY OF STORAGE DEVICES IN AN EMBEDDED STORAGE BASED ON FIREWARE VERSION OF EACH STORAGE DEVICE

CROSS REFERENCE TO RELATED APPLICATION

This application claims the priority benefit of Chinese Patent Application Serial Number 202211622219.6, filed on Dec. 16, 2022, the full disclosure of which is incorporated herein by reference.

BACKGROUND

Technical Field

This present disclosure relates to storage apparatus, and more particularly to an embedded storage apparatus and method thereof.

Related Art

In order to meet the needs of thinner and larger memory capacity of mobile devices, an embedded memory with small size, high integration and low complexity is lanched. In general, the embedded memory usually has embedded multimedia cards for storage and a controller for managing the embedded multimedia cards.

Since each embedded memory includes multiple embedded multimedia cards, the multiple embedded multimedia cards may come from different manufacturers, so the embedded multimedia cards in a single embedded memory may have firmware and specifications different from each other.

In order to perform read and write operations on multiple embedded multimedia cards, the controller will frequently switch different read/write modes and read/write speeds in response to the specifications and firmware of each of the embedded multimedia cards for performing read/write operations. Thus, the power consumption of the embedded memory and the possibility of jittering in the embedded multimedia card are increased. The above-mentioned situation for products with large memory capacity is more obvious, resulting in poor compatibility of multiple embedded multimedia cards.

Therefore, how to provide it is desirous to design an embedded memory that can easily be compatible with multiple embedded multimedia cards.

SUMMARY

The embodiment of the present disclosure provides an embedded storage apparatus and method thereof, which can easily be compatible with multiple embedded multimedia cards.

One embodiment of the present disclosure provides an method for managing an embedded storage apparatus which couples to a plurality of storage devices, and the method includes: obtaining a firmware version of the plurality of storage devices; obtaining best transmission configuration corresponding to each storage device according to the firmware version in each storage device; downwardly aligning the best transmission configuration of at least one of the plurality of storage devices based on the plurality of the best transmission configurations to determine a desired transfer configuration; and enabling the plurality of storage devices to perform read/write operations with the same desired transmission configuration.

Another embodiment of the present disclosure provides an method for managing an embedded storage apparatus which couples to a plurality of storage devices, and the method includes: obtaining a firmware version of the plurality of storage devices respectively; aligning a transmission configuration of at least one of the plurality of storage devices downward according to the firmware version of each of the plurality of storage devices to determine a desired transmission configuration; and enabling the plurality of storage devices to perform read/write operations with the same desired transmission configuration.

Another embodiment of the present disclosure provides an embedded storage apparatus, which includes a plurality of interface circuits configured to couple to a plurality of storage devices respectively and a processor circuit coupled to the plurality of interface circuits and configured to execute the method for managing the embedded storage apparatus.

In the embodiments of the present disclosure, the embedded storage apparatus enables multiple storage devices to perform read/write operations with the same transmission configuration. The embedded storage apparatus of the embodiments of the present disclosure does not need to frequently switch the read/write mode and read/write speed to perform the read/write operations of multiple storage devices. Thus, the overall energy consumption of the embedded storage apparatus and the occurrence of jitter are effectively reduced. The manufacture of the embedded storage apparatus is not affected by the differences in the specifications and firmware of the storage devices, and the number of storage devices of the embedded storage apparatus can be increased. Therefore, the goal of being easily compatible with a large number of storage devices is achieved.

It should be understood, however, that this summary may not contain all aspects and embodiments of the present disclosure, that this summary is not meant to be limiting or restrictive in any manner, and that the present disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the present disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the present disclosure. This description is made for the purpose of illustration of the general principles of the present disclosure and should not be taken in a limiting sense. The scope of the present disclosure is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the present disclosure.

Figure 1:
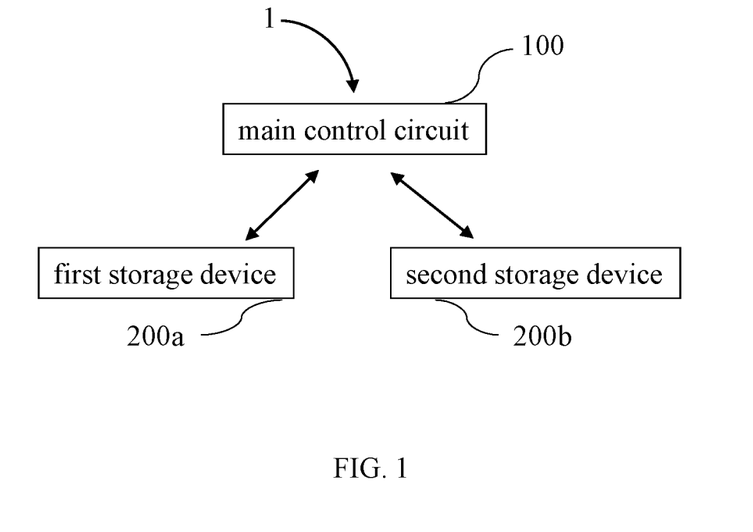
FIG. 1 is a block diagram of an example of embedded storage apparatus in which implementations of the present disclosure can operate.

Please refer to FIG. 1. FIG. 1 is a schematic block diagram of an embedded storage apparatus of the present disclosure. The embedded storage apparatus 1 comprises a main control circuit 100 and is coupled to a first storage device 200$a$ and a second storage device 200$b$. The main control circuit 100 is used to send command signals to the first storage device 200$a$ and the second storage device 200$b$, so that the first storage device 200$a$ and the second storage device 200$b$ perform corresponding operations in response to the command signals, for example, executing an method for managing the embedded storage apparatus 1 and read/write operations of the embedded storage apparatus 1.

In the embodiment, the first storage device 200$a$ and the second storage device 200$b$ are made to use a plurality of clocks with different phases in current transmission configuration to perform a transmission test and a reception test.

In the embodiment, two storage devices (the first storage device 200$a$ and the second storage device 200$b$) are taken as an example for illustration, but the number of storage device in this disclosure is not limited to two.

In some embodiments, the first storage device 200$a$ and the second storage device 200$b$ can be an embedded multimedia card chip, which includes a memory array (not shown) for storing data and a controller circuit (not shown) for controlling the memory array. In some embodiments, the memory array can be a flash memory.

Figure 2:
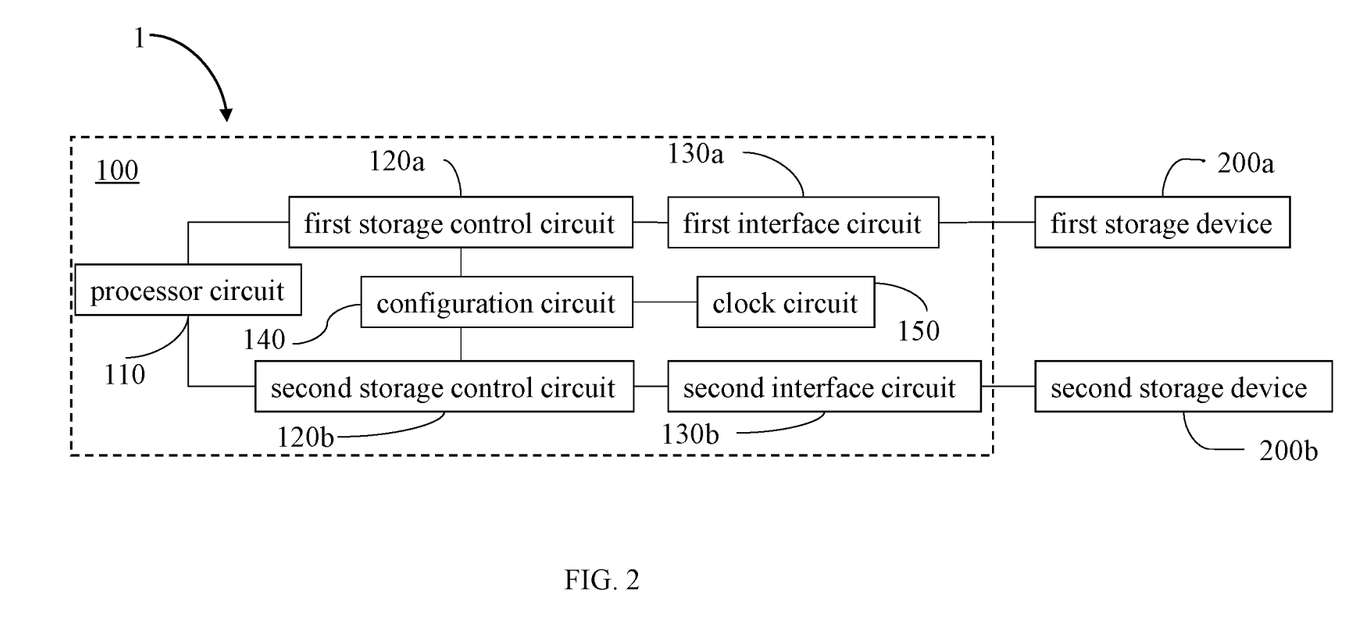
FIG. 2 is a block diagram of an example of main control circuit in which implementations of the present disclosure can operate.

Please refer to FIG. 2, which is another schematic structural diagram of the embedded storage apparatus 1 of the present disclosure. The main control circuit 100 includes a processor circuit 110, a first storage control circuit 120$a$, a second storage control circuit 120$b$, a first interface circuit 130$a$, a second interface circuit 130$b$, a configuration circuit 140 and a clock circuit 150. The processor circuit 110 is coupled to the first storage control circuit 120$a$ and the second storage control circuit 120$b$. The first storage control circuit 120$a$ and the second storage control circuit 120$b$ are coupled to the configuration circuit 140, and the first storage control circuit 120$a$ is coupled to the first interface circuit 130$a$, and the second storage control circuit 120$b$ is coupled to the second interface circuit 130$b$. The first interface circuit 130$a$ is coupled to the first storage device 200$a$, the second interface circuit 130$b$ is coupled to the second storage device 200$b$, and the first interface circuit 130$a$ and the second interface circuit 130$b$ are coupled to the clock circuit 150. The configuration circuit 140 is coupled to the clock circuit 150.

The processor circuit 110 is used to control the first storage control circuit 120$a$ and the second storage control circuit 120$b$ to execute the method and the read/write operations of the first storage device 200$a$ and the second storage device 200$b$. In an embodiment, the processor circuit 110 may be (but not limited to) a central processing unit (CPU), a multi-processor, a pipeline processor, a distributed processing system, and the like.

The first storage control circuit 120$a$ and the second storage control circuit 120$b$ are respectively configured to respond to the processor circuit 110 to enable the configuration circuit 140 to generate a transmission configuration data. The first storage control circuit 120$a$ and the second storage control circuit 120$b$ are used to individually generate instruction signals provided to the first storage device 200$a$ and the second storage device 200$b$. The clock circuit 150 generates a corresponding clock signal in response to the transmission configuration data provided by the configuration circuit 140 and provides the clock signal to the first interface circuit 130$a$ and the second interface circuit 130$b$. The first interface circuit 130$a$ and the second interface circuit 130$b$ are used to individually provide the command signal and the clock signal to the first storage device 200$a$ and the second storage device 200$b$. Therefore, the first storage device 200$a$ and the second storage device 200$b$ can respond to the received instruction signals and clock signal to perform corresponding transmission configuration settings or read/write operations.

In this embodiment, the transmission configuration includes a transmission mode configuration of a storage device and a corresponding clock frequency configuration. The transmission mode configuration is a bus rate mode used by the first storage device 200$a$ and the second storage device 200$b$, such as a High-speed DDR, HS200, HS400 and etc.

Figure 3:
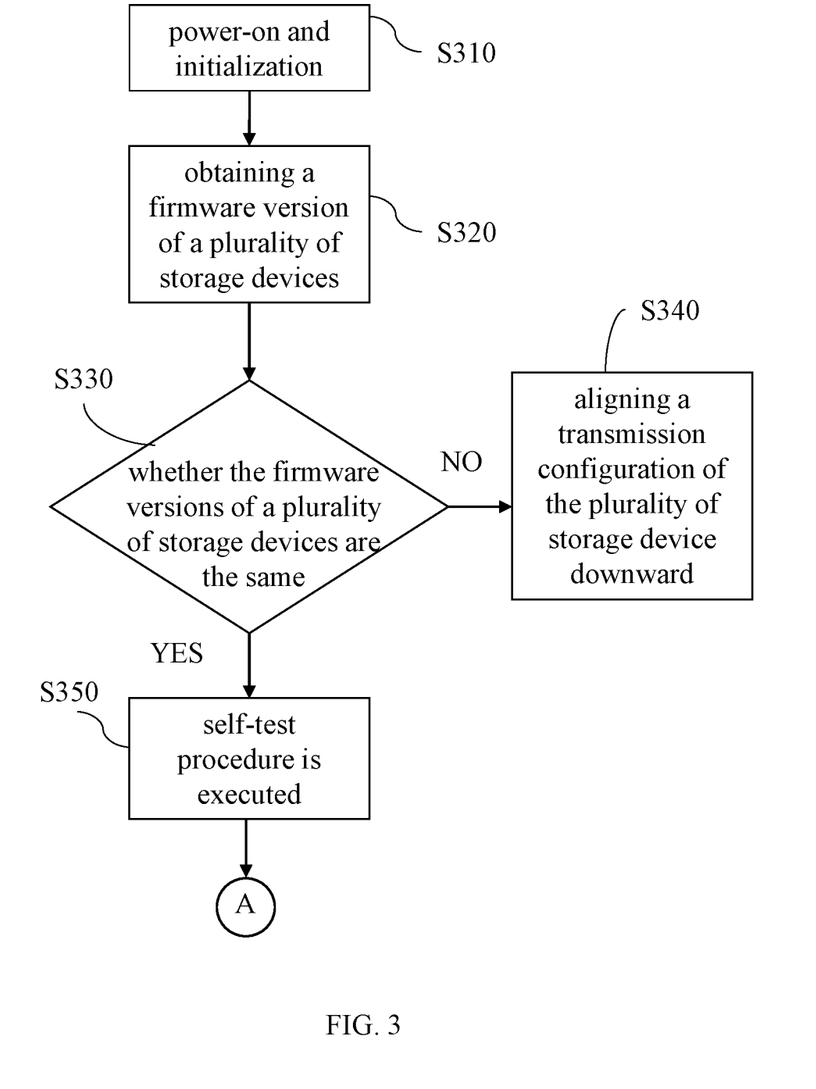
FIG. 3 is a flowchart of an example method in which implementations of the present disclosure can operate.
Figure 4:
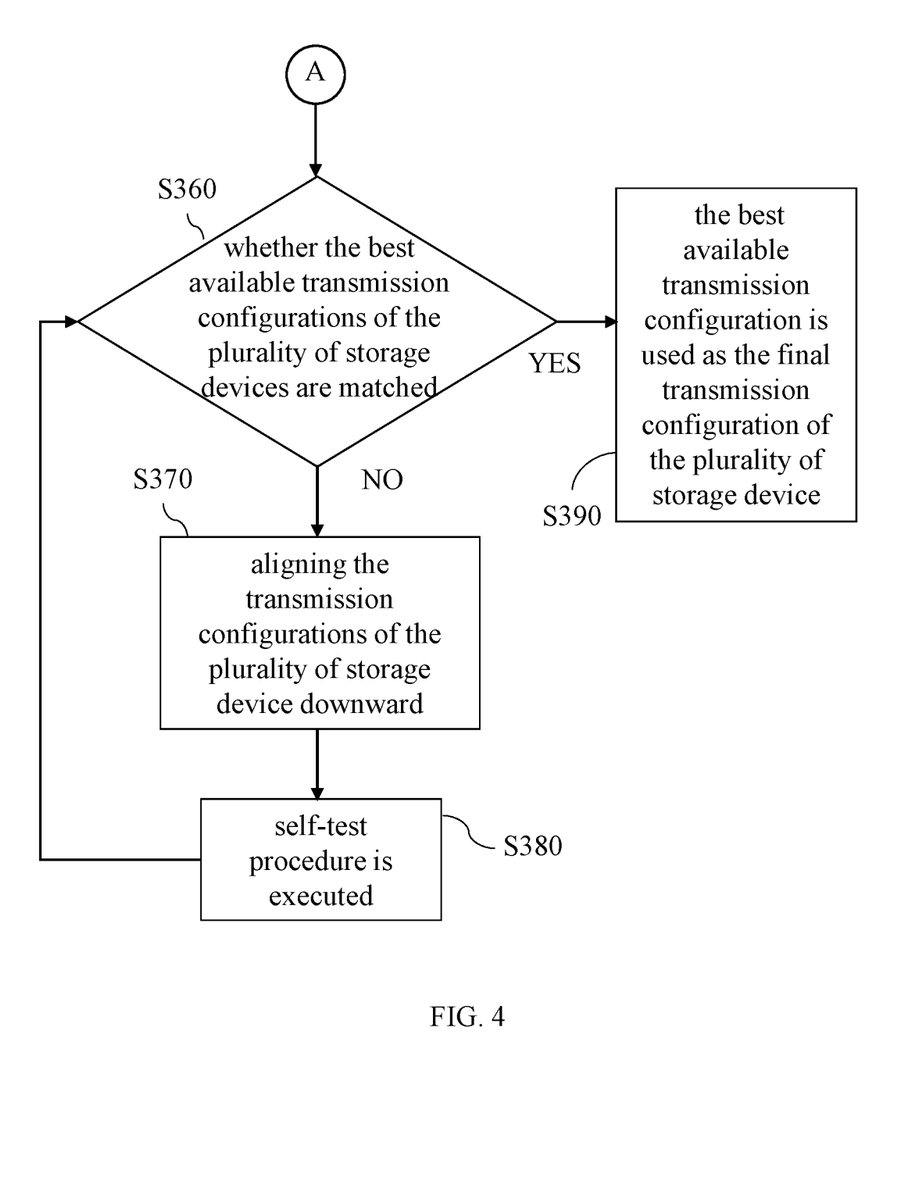
FIG. 4 is a flowchart of the example method in which implementations of the present disclosure can operate.

In order to illustrate the method of the embedded storage apparatus 1, please further refer to FIG. 2, FIG. 3 and FIG. 4. FIG. 3 and FIG. 4 are schematic diagrams of an embodiment of the method for managing an embedded storage apparatus of the present disclosure. The method of the embedded storage apparatus 1 is used to align the transmission configuration of at least one of the multiple storage devices downwards to determine a desired transmission configuration and enable the multiple storage devices to perform the read/write operations with the same desired transmission configuration.

In step S310, performing the step of power-on and initialization. The embedded storage apparatus 1 is powered on and performs initialization operations of the first storage device 200a and the second storage device 200b.

In step S320, obtaining a firmware version of a plurality of storage devices respectively. In this step, the processor circuit 110 obtained the firmware versions of each of the plurality of storage devices respectively. In this embodiment, the processor circuit 110 enables the first storage control circuit 120a and the second storage control circuit 120b to obtain the current firmware versions of the first storage device 200a and the second storage device 200b respectively. For example, the first storage control circuit 120a and the second storage control circuit 120b are controlled by the processor circuit 110 to individually call the current firmware version data of the first storage device 200a and the second storage device 200b with instruction signals.

In step S330, determining whether the firmware versions of a plurality of storage devices are the same. In this embodiment, the processor circuit 110, after obtaining a current firmware version data of the first storage device 200a and the second storage device 200b, the current firmware version data of the first storage device 200a and the second storage device 200b is compared to confirm that the firmware versions of the first storage device 200a and the second storage device 200b are the same or not. When the firmware versions of the first storage device 200a and the second storage device 200b are different, the method proceeds to step S340. When the firmware versions of the first storage device 200a and the second storage device 200b are same, the method proceeds to step S350.

In step S340, aligning a transmission configuration of the plurality of storage devices downward. When the firmware versions of the plurality of storage devices are different from each other, the transmission configuration of at least one of the plurality of storage devices is aligned downwards according to the firmware versions of the plurality of storage devices. A preset transmission configuration is generated based on the firmware versions of the plurality of storage devices, and the transmission configuration of the at least one of the plurality of storage devices is updated with the preset transmission configuration. Since in step S330, the firmware versions of the first storage device 200a and the second storage device 200b are determined to be different, it means that the optional transmission configurations of the two storage devices are different. Therefore, in order to enable the two storage devices to operate in the same transmission configuration, the processor circuit 110 enables the configuration circuit 140 to generate the preset transmission configuration based on the firmware versions of the plurality of storage devices, and enables the at least one of the plurality of storage devices to update the transmission configuration with the preset transmission configuration. In step S340, the processor circuit 110 enables the configuration circuit 140 to generate a transfer configuration that can be executed by a storage device with a lower-level firmware version as the preset transmission configuration according to the determination result of step S330. The transmission configuration of the storage device with a newer firmware version is updated to the preset transmission configuration. Thus, the transmission configuration of the storage device with the newer firmware version is aligned downward to the transmission configuration of the storage device with an older firmware version. For example, when the processor circuit 110 determined that the firmware version of the first storage device 200a is version 5.1 and the firmware version of the second storage device 200b is version 4.5 according to the current firmware version data, the transmission configuration of the first storage device 200a is adjusted to the configuration that can be executed under the firmware version is version 4.5. For example, the transmission configuration is updated from HS400 mode to High-speed DDR mode, and the clock frequency is 52 MHz.

In one embodiment, the preset transmission configuration is a transmission configuration that is executable by a storage device with an older firmware version and has the highest data transmission rate. Thus, the operations of step S330 and step S340 are used to determine the transmission configuration that can be operated by both the first storage device 200a and the second storage device 200b.

In step S350, a self-test procedure is executed. In this step, the plurality of storage devices is enabled to perform a self-test procedure to determine a best transmission configuration for each of the plurality of storage devices. The best transmission configuration is a transmission configuration that can be executed by one of the plurality of storage devices and has the highest transmission rate, and the transmission rate of the best transmission configuration is less than or equal to the transmission rate of the preset transmission configuration. In this embodiment, the processor circuit 110 enables the first storage device 200a and the second storage device 200b to perform the self-test procedure with the preset transmission configuration to determine the best transmission configurations that can be executed by the first storage device 200a and the second storage device 200 respectively. The best transmission configuration is the transmission configuration corresponding to the first storage device 200a or the second storage device 200b, which can be executed by the first storage device 200a or the second storage device 200b and has the highest transmission rate, and the transmission rate of the best transmission configuration is less than or equal to the transmission rate of the preset transmission configuration.

In the embodiment in which the firmware versions of the first storage device 200a and the second storage device 200b are the same, the same transmission configuration with the highest transmission rate in the same firmware version is used to as the preset transmission configuration of the first storage device 200a and the second storage device 200b. For example, when both the firmware versions of the first storage device 200a and the second storage device 200b are determined to be version 4.5, the transmission mode of the preset transmission configuration is configured as a high-speed DDR mode, and the clock frequency is configured as 52 MHz.

In step S360, determining whether the best transmission configurations of the plurality of storage devices are matched. In this step, the processor circuit 110 used the best transmission configurations obtained in step S350 to test the first storage device 200a and the second storage device 200b to confirm that whether the best transmission configuration of the first storage device 200a and the best transmission configuration of the second storage device 200b are matched. For example, whether the first storage device 200a and the second storage device 200b can operate normally under their respective best transmission configurations. If the first storage device 200a and the second storage device 200b cannot operate normally under their respective best transmission configurations, the method proceeds to step S370. If the first storage device 200a and the second storage device 200b can operate normally under their respective best transmission configurations, the method proceeds to step S390.

In step S370, aligning the transmission configurations of the plurality of storage devices downward. When the best transmission configurations of the plurality of storage devices do not match each other, the transmission configuration of at least one of the plurality of storage devices is aligned downward. A preset available transmission configuration is generated based on the best transmission configuration of the plurality of storage devices that do not match each other, and the transmission configuration of at least one of the plurality of storage devices is updated with the preset available transmission configuration. In this embodiment, similar to step S340, the processor circuit 110 enables the configuration circuit 140 to generate a preset available transmission configuration based on the best transmission configurations of the plurality of storage devices and update the transmission configuration of the at least one of the plurality of storage devices with the preset available transmission configuration. The processor circuit 110 enabled the configuration circuit 140 to generate a transmission configuration as the preset available transmission configuration that is executable by both the first storage device 200a and the second storage device 200b according to the determination result of step S370. For example, when the best transmission configuration of the first storage device 200a is a high-speed DDR mode with a clock frequency of 52 MHz, and the best transmission configuration of the second storage device 200b is a high-speed SDR mode with a clock frequency of 52 MHz, the transmission configuration of the first storage device 200a is adjusted to the high-speed SDR mode with the clock frequency of 52 MHz to align to the transmission configuration of the second storage device 200b.

In step S380, a self-test procedure is executed. In this embodiment, similar to step S350, the processor circuit 110 enabled the first storage device 200a and the second storage device 200b to perform the self-test procedure with the preset available transmission configuration as the self-test configuration. Thus, the best transmission configuration of the first storage device 200a and the best transmission configuration of the second storage device 200b are updated through the self-test procedure. After step S380, the operation returns to step S360 to determine whether the best transmission configurations of the plurality of storage devices matched.

In step S390, the best transmission configuration is used as the desired transmission configuration of the plurality of storage devices. When the best transmission configurations of the plurality of storage devices matched each other, the matched best transmission configurations is used as the desired transmission configuration. In this embodiment, since the first storage device 200a and the second storage device 200b have the same best transmission configuration, the processor circuit 110 used the current best transmission configuration as the desired transmission configuration of the first storage device 200a and the second storage device 200b. Therefore, the first storage device 200a and the second storage device 200b is configured to perform read/write operations with the desired transmission configuration and the self-test procedure is ended.

Figure 5:
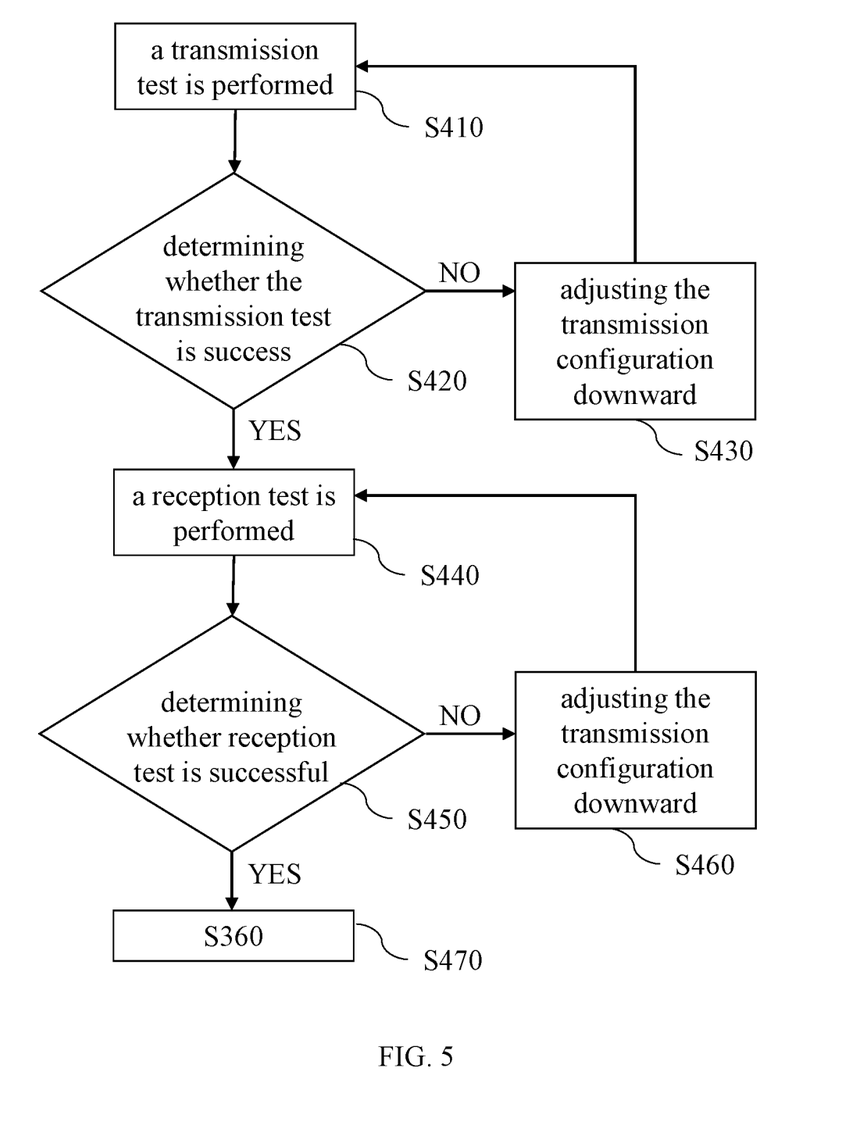
FIG. 5 is a flowchart of an example of self-test procedure of a method in which implementations of the present disclosure can operate.

Please refer to FIG. 5, which is a schematic diagram of an embodiment of a method for managing an embedded storage apparatus. In step S350 or step S380, the steps further include steps S410 to S470. In this embodiment, one storage device (the first storage device 200a or the second storage device 200b) and one storage control circuit (the first storage control circuit 120a or the second storage control circuit 120b) are used for illustration. First, the storage device is enabled to perform a transmission test and a reception test with the current transmission configuration. When the transmission test and reception test of the storage device are failed, the transmission configuration of the storage device is adjusted downward, and the transmission test and reception test are performed again with the adjusted transmission configuration. When the transmission test and reception test of the storage device are success, the current transmission configuration is used as the best transmission configuration for the storage device.

In step S410, a transmission test is performed. In this embodiment, the processor circuit 110 enabled the storage control circuit to perform the transmission test, so that instructions and data are provided to the storage device in different phases under the current transmission configuration.

In step S420, determining whether the transmission test is success. If the transmission test is success, the method proceeds to step S440. If the transmission test is failed, the method proceeds to step S430. In this embodiment, the processor circuit 110 responds to the transmission test results of different phases of the storage device under the current transmission configuration to determine whether the transmission test of the storage device under the current transmission configuration is success. When the transmission test result of at least one phase of the storage device under the current transmission configuration is success, the processor circuit 110 determined that the transmission test result of the storage device under the current transmission configuration is success.

In step S430, adjusting the transmission configuration downward. Since in step S420, the transmission test result of the storage device with the current transmission configuration fails, the processor circuit 110 adjusts the transmission configuration of the storage device downward, and then the step S410 is proceeded again. The downward adjustment is to update the current transmission configuration with a clock frequency configuration or a transmission mode configuration that with a level lower than the current transmission configuration. For example, the current transmission configuration is adjusted downward from the High-speed DDR mode to the High-speed SDR mode, or the current clock frequency configuration is adjusted downward from 52 MHz to 50 MHz.

In step S440, a reception test is performed. In this embodiment, based on a successful transmission test, the processor circuit 110 further enabled the storage control circuit to perform a reception test. Thus, instructions and data are provided and written to the storage device in different phases under the current transmission configuration.

In step S450, determining whether reception test is success. When the reception test is success, the method proceeds to step S470 and back to step S360. When the reception test is failed, the method proceeds to step S460. In this embodiment, the processor circuit 110 determined whether the reception test of the storage device under the current transmission configuration is success in response to the reception test results of different phases of the storage device under the current transmission configuration. When the reception test result of at least one phase of the storage device under the current transmission configuration is success, the processor circuit 110 determined that the reception test result of the storage device under the current transmission configuration is success. That is, the current transmission configuration is the best transmission configuration of the storage device and is the transmission configuration with the highest the transmission rate among the transmission configurations that the storage device can execute.

In step S460, adjusting the transmission configuration downward. In step S450, the reception test result of the current transmission configuration of the storage device is failed, so the processor circuit 110 adjusted the transmission configuration of the storage device downward, and then proceeded to step S440 again. The downward adjustment is the same as step S430, so it will not be repeated here.

The embedded storage apparatus of the embodiment of the present disclosure can confirm the transmission configuration of the plurality of storage devices, so that the plurality of storage devices can perform read/write operations with the same transmission configuration. The embedded storage apparatus of the present disclosure does not need to frequently switch between read/write modes and read/write speeds to perform read/write operations on the plurality of storage devices, the overall energy consumption of the embedded storage apparatus and the occurrence of jitter are effectively reduced. The manufacture of the embedded storage apparatus is not affected by the differences in the specifications and firmware of the storage device, and the number of storage device of the embedded storage apparatus can be increased. Therefore, the goal of being easily compatible with a large number of storage device is achieved. The method of aligning the transmission configuration of the storage device downward can quickly obtain the transmission configuration with the highest transmission rate under the condition that all storage device can be executed, the speed of device initialization is speeded up and the overall operation of the embedded storage apparatus efficiency is improved.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the present disclosure. Accordingly, such modifications are considered within the scope of the present disclosure as limited solely by the appended claims.

What is claimed is:

1. A method for managing an embedded storage apparatus which couples to a plurality of storage devices, the method comprising:
    obtaining a firmware version of the plurality of storage devices;
    obtaining best transmission configurations corresponding to each storage device according to the firmware version in each storage device by performing a self-test procedure by the plurality of storage devices, wherein the best transmission configuration is a transmission configuration that each of the plurality of storage devices execute and has a highest transmission rate and the transmission rate of the best transmission configuration is less than or equal to the transmission rate of a preset transmission configuration;
    downwardly aligning the best transmission configuration of at least one of the plurality of storage devices based on the plurality of the best transmission configurations to determine a desired transmission configuration; and
    enabling the plurality of storage devices to perform read/write operations with the same desired transmission configuration;
    wherein the self-test procedure comprises:
        enabling at least one of the storage devices to execute a transmission test and a reception test with a current transmission configuration;
        in response to the transmission test and the reception test executed by the storage device being success, configuring the current transmission configuration as the best transmission configuration of the storage device;
        in response to the transmission test and reception test executed by the storage device failing, adjusting the current transmission configuration downward and then configuring the storage device of the plurality of storage devices to execute the transmission test and the reception test with the adjusted transmission configuration.

2. The method according to claim 1, wherein the step of obtaining best transmission configurations corresponding to each storage device according to the firmware version in each storage device comprises:
    aligning a transmission configuration of the at least one of the plurality of storage devices downward when the firmware versions of the plurality of storage devices are different.

3. The method according to claim 1, wherein the step of obtaining best transmission configurations corresponding to each storage device according to the firmware version in each storage device comprises:
    aligning a transmission configuration of the at least one of the plurality of storage devices when the best transmission configurations of the plurality of storage devices do not match to each other.

4. The method according to claim 1, wherein the storage device is made to use a plurality of clocks with different phases in the current transmission configuration to perform the transmission test and the reception test.

5. The method according to claim 1, wherein the step of adjusting the current transmission configuration downward is to update the current transmission configuration with a lower clock frequency configuration or transmission mode configuration than the current transmission configuration.

6. A method for managing an embedded storage apparatus which couples to a plurality of storage devices, the method comprising:
    obtaining a firmware version of the plurality of storage devices respectively;
    aligning a transmission configuration of at least one of the plurality of storage devices downward according to the firmware version of each of the plurality of storage devices to determine a desired transmission configuration;
    performing a self-test procedure by the plurality of storage devices to determine a best transmission configuration for each of the plurality of storage devices, wherein the best transmission configuration is a transmission configuration that each of the plurality of storage devices execute and has a highest transmission rate and the transmission rate of the best transmission configuration is less than or equal to the transmission rate of a preset transmission configuration;

enabling the plurality of storage devices to perform read/write operations with the same desired transmission configuration;

wherein the self-test procedure comprises:
  enabling at least one of the storage devices to execute a transmission test and a reception test with a current transmission configuration;
  in response to the transmission test and the reception test executed by the storage device being success, configuring the current transmission configuration as the best transmission configuration of the storage device;
  in response to the transmission test and reception test executed by the storage device failing, adjusting the current transmission configuration downward and then configuring the storage device of the plurality of storage devices to execute the transmission test and the reception test with the adjusted transmission configuration.

7. The method according to claim 6, wherein the step of aligning a transmission configuration of at least one of the plurality of storage devices downward according to the firmware version of each of the plurality of storage devices for determining a desired transmission configuration comprises:
  aligning the transmission configuration of the at least one of the plurality of storage devices downward when the firmware versions of the plurality of storage devices are different.

8. The method according to claim 6, wherein the step of aligning a transmission configuration of at least one of the plurality of storage devices downward according to the firmware version of each of the plurality of storage devices for determining a desired transmission configuration comprises:
  aligning the transmission configuration of the at least one of the plurality of storage devices when best transmission configurations of the plurality of storage devices do not match to each other.

9. The method according to claim 6, wherein the step of aligning a transmission configuration of at least one of the plurality of storage devices downward according to the firmware version of each of the plurality of storage devices for determining a desired transmission configuration comprises:
  configuring the best transmission configuration matched as the desired transmission configuration of the plurality of storage devices when the best transmission configurations of the plurality of storage devices match to each other.

10. The method according to claim 7, wherein the step of aligning the transmission configuration of the at least one of the plurality of storage devices downward when the firmware versions of the plurality of storage devices are different comprises:
  generating a preset transmission configuration based on the firmware versions of the plurality of storage devices and updating the transmission configuration of the at least one of the plurality of storage devices with the preset transmission configuration.

11. The method according to claim 6 further comprising:
  generating a preset available transmission configuration based on best transmission configurations of the plurality of storage devices that do not match each other and updating the transmission configuration of the at least one of the plurality of storage devices with the preset available transmission configuration.

12. The method according to claim 6, wherein the storage device is made to use a plurality of clocks with different phases in the current transmission configuration to perform the transmission test and the reception test.

13. The method according to claim 6, wherein the step of adjusting the current transmission configuration downward is to update the current transmission configuration with a lower clock frequency configuration or transmission mode configuration than the current transmission configuration.

14. An embedded storage apparatus, comprising:
  a plurality of interface circuits, configured to couple to a plurality of storage devices respectively; and
  a processor circuit, coupled to the plurality of interface circuits, configured to obtain a firmware version of the plurality of storage devices respectively;
  obtain best transmission configuration corresponding to each storage device according to the firmware version in each storage device by performing a self-test procedure by the plurality of storage devices, wherein the best transmission configuration is a transmission configuration that each of the plurality of storage devices execute and has a highest transmission rate and the transmission rate of the best transmission configuration is less than or equal to the transmission rate of a preset transmission configuration;
  downwardly align the best transmission configuration of at least one of the plurality of storage devices based on the plurality of the best transmission configurations to determine a desired transfer configuration;
  enable the plurality of storage devices to perform read/write operations with the same desired transmission configuration
  wherein the self-test procedure comprises:
    enabling at least one of the storage devices to execute a transmission test and a reception test with a current transmission configuration;
    in response to the transmission test and the reception test executed by the storage device being success, configuring the current transmission configuration as the best transmission configuration of the storage device;
    in response to the transmission test and reception test executed by the storage device failing, adjusting the current transmission configuration downward and then configuring the storage device of the plurality of storage devices to execute the transmission test and the reception test with the adjusted transmission configuration.

15. The embedded storage apparatus according to claim 14, wherein the storage device is made to use a plurality of clocks with different phases in the current transmission configuration to perform the transmission test and the reception test.

16. The embedded storage apparatus according to claim 14, wherein the processor circuit is configured to update the current transmission configuration with a lower clock frequency configuration or transmission mode configuration than the current transmission configuration.

\* \* \* \* \*